US011393349B2

(12) United States Patent
Mier et al.

(10) Patent No.: US 11,393,349 B2
(45) Date of Patent: Jul. 19, 2022

(54) AIR TRAFFIC CONTROL (ATC) RADIO COMMUNICATIONS AUTHENTICATION

(71) Applicant: The Boeing Company, Chicago, IL (US)

(72) Inventors: David S. Mier, Mercer Island, WA (US); Alan G. Tomaszycki, Port Orchard, WA (US)

(73) Assignee: The Boeing Company, Chicago, IL (US)

( * ) Notice: Subject to any disclaimer, the term of this patent is extended or adjusted under 35 U.S.C. 154(b) by 64 days.

(21) Appl. No.: 16/821,346

(22) Filed: Mar. 17, 2020

(65) Prior Publication Data

US 2021/0295720 A1 Sep. 23, 2021

(51) Int. Cl.
*G06F 19/00* (2018.01)
*G06G 7/70* (2006.01)
*G06G 7/76* (2006.01)
*G08G 5/00* (2006.01)
*H04W 12/069* (2021.01)
*G08G 1/0968* (2006.01)

(52) U.S. Cl.
CPC ..... *G08G 5/0095* (2013.01); *G08G 1/096872* (2013.01); *G08G 5/0013* (2013.01); *G08G 5/0026* (2013.01); *H04W 12/069* (2021.01)

(58) Field of Classification Search
CPC ........... G08G 5/0095; G08G 1/096872; G08G 5/0013; G08G 5/0026; H04W 12/069
USPC ...................................................... 701/120
See application file for complete search history.

(56) References Cited

U.S. PATENT DOCUMENTS

| 6,185,430 | B1 * | 2/2001 | Yee ..................... H04B 7/18508 379/184 |
| 9,124,580 | B1 * | 9/2015 | Sampigethaya ......... H04B 3/54 |
| 2006/0046715 | A1 * | 3/2006 | Burgemeister ....... G08G 5/0013 455/431 |
| 2008/0045198 | A1 | 2/2008 | Bhogal et al. |
| 2016/0155435 | A1 * | 6/2016 | Mohideen ............... G10L 15/30 704/235 |
| 2016/0379640 | A1 * | 12/2016 | Joshi ....................... G10L 15/22 704/235 |
| 2017/0103751 | A1 * | 4/2017 | Du ......................... G07C 5/008 |
| 2018/0013723 | A1 * | 1/2018 | Kirk .................... H04L 63/0272 |
| 2019/0013027 | A1 * | 1/2019 | Page ...................... G06F 21/32 |
| 2019/0371341 | A1 * | 12/2019 | Schwindt ............ H04L 63/0861 |
| 2020/0143694 | A1 * | 5/2020 | Kanagarajan ........ G08G 5/0052 |

FOREIGN PATENT DOCUMENTS

| EP | 3576367 A1 | 12/2019 |
| WO | 2016160593 A1 | 10/2016 |

OTHER PUBLICATIONS

Extended European Search Report dated Aug. 3, 2021 for European Patent Application No. 21159781.0, 7 pages.

* cited by examiner

Primary Examiner — Mahmoud S Ismail
(74) Attorney, Agent, or Firm — Sage Patent Group

(57) ABSTRACT

A method for air traffic control (ATC) radio communications authentication, includes receiving, by an aircraft, an ATC voice communication from an ATC facility. The method also includes receiving, by the aircraft, authentication data from the ATC facility substantially contemporaneously with the ATC voice communication. The authentication data is associated with the ATC voice communication. The method further includes authenticating the ATC voice communication using the authentication data.

20 Claims, 3 Drawing Sheets

AIR TRAFFIC CONTROL (ATC) RADIO COMMUNICATIONS AUTHENTICATION

FIELD

The subject disclosure relates to radio communications and more particularly to air traffic control (ATC) radio communications authentication.

BACKGROUND

Air traffic control (ATC) radio communications with aircraft are open communications so that the radio communications can be received and understood by any aircraft in the vicinity of an ATC facility and any other receivers tuned to the same frequency. Accordingly, ATC radio communications cannot be protected from hacking or spoofing by encryption or obfuscating the message so only authorized receivers with the correct key can understand the radio communications. Authentication of ATC radio communications is needed to confirm that the radio communications are actually coming from an ATC controller and not some rogue actor impersonating an ATC controller.

SUMMARY

In accordance with an example, a method for air traffic control (ATC) radio communications authentication includes receiving, by an aircraft, an ATC voice communication from an ATC facility. The method additionally includes receiving, by the aircraft, authentication data from the ATC facility substantially contemporaneously with the ATC voice communication. The authentication data is associated with the ATC voice communication. The method further includes authenticating the ATC voice communication using the authentication data.

In accordance with another example, a method for air traffic control (ATC) radio communication authentication includes transmitting, by an ATC facility, an ATC voice communication to an aircraft. The method additionally includes transmitting, by the ATC facility, authentication data to the aircraft. The authentication data is associated with the ATC voice communication. The ATC voice communication is authenticated by the aircraft using the authentication data.

In accordance with another example, a system for air traffic control (ATC) radio communications authentication includes a processor and a memory associated with the processor. the memory includes computer-readable program instructions that, when executed by the processor causes the processor to perform a set of functions. The set of functions include receiving an ATC voice communication from an ATC facility. The set of functions also include receiving authentication data from the ATC facility substantially contemporaneously with the ATC voice communication. The authentication data is associated with the ATC voice communication. The set of functions further include authenticating the ATC voice communication using the authentication data.

In accordance with another example, a system for air traffic control (ATC) radio communications authentication includes a processor and a memory associated with the processor. The memory includes computer-readable program instructions that, when executed by the processor causes the processor to perform a set of functions. The set of functions include transmitting or directing an ATC voice communication to an aircraft. The set of functions also include transmitting or directing authentication data to the aircraft. The authentication data is associated with the ATC voice communication. The aircraft uses the authentication data to authenticate the ATC voice communication.

In accordance with an example and any of the preceding examples, the method and system or set of functions include providing an authentication indication in response to the ATC voice communication being authenticated.

In accordance with an example and any of the preceding examples, wherein receiving the authentication data includes receiving a digital certificate.

In accordance with an example and any of the preceding examples, wherein authenticating the ATC voice communication includes authenticating the digital certificate as the digital certificate for the ATC facility that is supposed to be transmitting the ATC voice communication.

In accordance with an example and any of the preceding examples, wherein authenticating the ATC voice communication includes comparing the digital certificate received by the aircraft to a digital certificate stored by the aircraft for the ATC facility that is supposed to be transmitting the ATC voice communication.

In accordance with an example and any of the preceding examples, the method and system or set of functions further include providing an authentication true or successful indication in response to at least the digital certificate being determined to be authentic. The method and system further include providing an authentication false or failure indication in response to at least the digital certificate being determined to not be authentic.

In accordance with an example and any of the preceding examples, the method and system or set of functions further include storing, onboard the aircraft, authentication data for a plurality of ATC facilities.

In accordance with an example and any of the preceding examples, wherein storing the authentication data includes storing, onboard the aircraft, a digital certificate for each of the plurality of ATC facilities.

In accordance with an example and any of the preceding examples, wherein receiving the authentication data comprises receiving a text message, wherein the text message comprises a translation of the ATC voice communication.

In accordance with an example and any of the preceding examples, wherein authenticating the ATC voice communication includes comparing the text message received to the ATC voice communication received from the ATC facility.

In accordance with an example and any of the preceding examples, wherein receiving the authentication data includes receiving the authentication data over a different communications channel to a communications channel over which the ATC voice communication is received.

In accordance with an example and any of the preceding examples, wherein receiving the authentication data includes receiving the authentication data at a different frequency from a frequency at which the ATC voice communication is received.

In accordance with an example and any of the preceding examples, wherein transmitting the authentication data to the aircraft includes transmitting a digital certificate of the ATC facility to the aircraft to authenticate the ATC voice communication by the aircraft.

In accordance with an example and any of the preceding examples, wherein the method and system or set of functions further include translating the ATC voice communication to a text message; digitally signing the text message, wherein the authentication data includes the text message with a digital certificate; and transmitting the text message with a digital certificate to the aircraft substantially contemporaneously with the ATC voice communication, wherein the aircraft uses the text message and the digital certificate to authenticate the ATC voice communication.

The features, functions, and advantages that have been discussed can be achieved independently in various examples or may be combined in yet other examples further details of which can be seen with reference to the following description and drawings.

DETAILED DESCRIPTION

Figure 1:
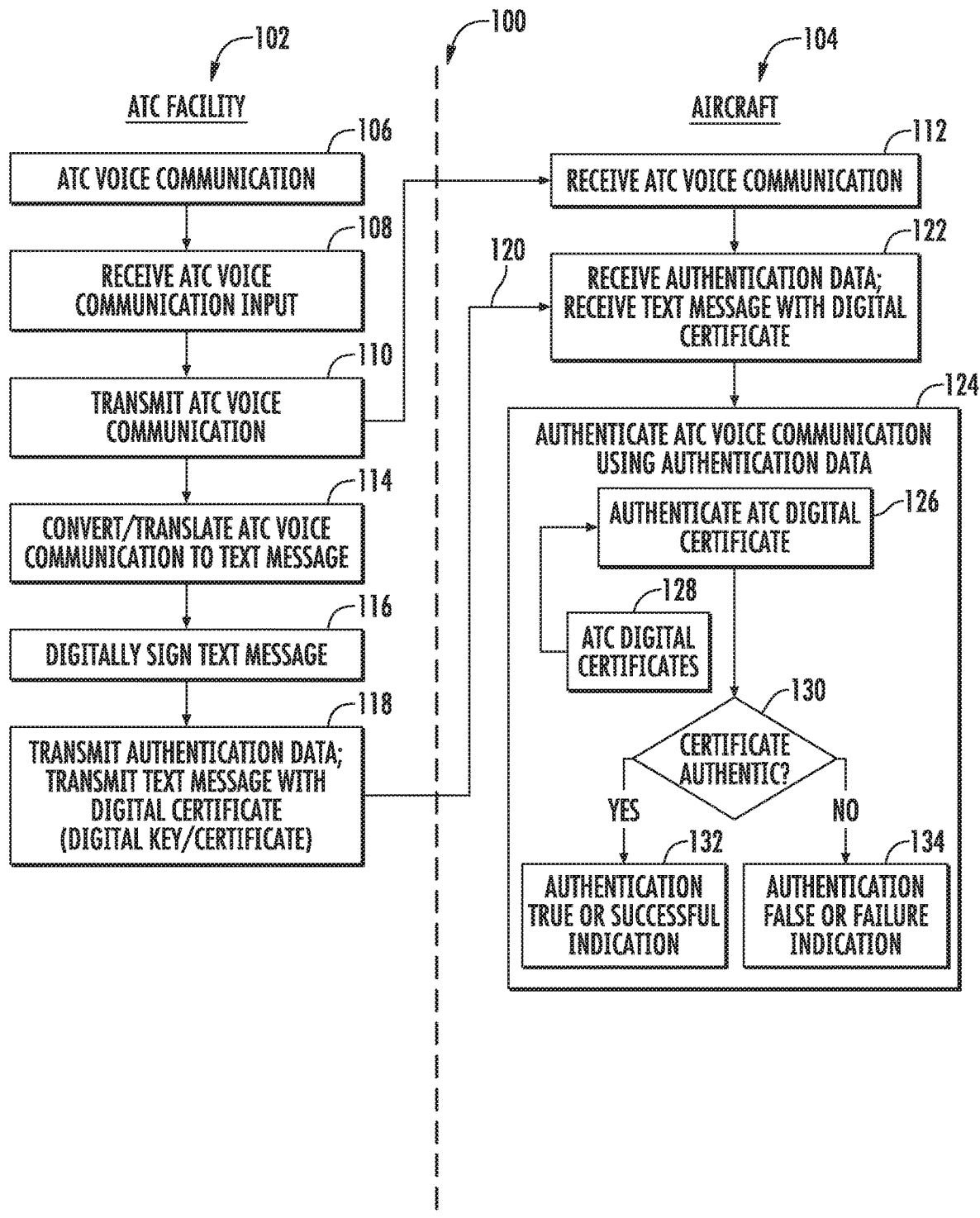
FIG. 1 is a flow chart of an example of a method for air traffic control (ATC) radio communications authentication in accordance with an example of the subject disclosure.

The following detailed description of examples refers to the accompanying drawings, which illustrate specific examples of the disclosure. Other examples having different structures and operations do not depart from the scope of the subject disclosure. Like reference numerals may refer to the same element or component in the different drawings.

The subject disclosure may be a system, a method, and/or a computer program product. The computer program product may include a computer readable storage medium (or media) having computer readable program instructions thereon for causing a processor to carry out aspects of the subject disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the subject disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the subject disclosure.

Aspects of the subject disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

FIG. 1 is a flow chart of an example of a method 100 for air traffic control (ATC) radio communications authentication in accordance with an example of the subject disclosure. The method 100 is separated into operations performed by an air traffic control (ATC) facility 102 and operations performed by an aircraft 104. In block 108, an ATC voice communication 106 is received as an input by the ATC facility 102 for transmission to the aircraft 104. In some examples, the ATC voice communication 106 is received by a radio frequency (RF) or wireless communications device, e.g. transceiver 302 (FIG. 3), of the ATC facility 102 from an operator speaking into a microphone of the RF communications device.

In block 110, the ATC voice communication 106 is transmitted or directed by the ATC facility 102 to the aircraft 104. In block 112, the ATC voice communication 106 is received by the aircraft 104 from the ATC facility 102.

In block 114, the ATC voice communication 106 is converted or translated to a text message. In block 116, the text message is digitally signed.

In block 118, authentication data 120 is transmitted or directed by the ATC facility 102 to the aircraft 104. The authentication data 120 is associated with the ATC voice communication 106. In some examples, the authentication data 120 includes a digital certificate of the ATC facility 102.

In block 122, the aircraft 104 receives the authentication data 120 from the ATC facility 102 substantially contemporaneously with the ATC voice communication 106. Substantially contemporaneously as used herein means at the same time or at about the same time. The ATC voice communication 106 is authenticated by the aircraft 104 using the authentication data 120. As previously described, in some examples, the authentication data 120 includes a digital certificate of the ATC facility 102. The digital certificate of the ATC facility 102 is used by the aircraft 104 to authenticate the ATC voice communication 106. In some examples, transmitting the authentication data 120 in block 118 includes transmitting the text message with the digital certificate of the ATC facility 102 to the aircraft 104 substantially contemporaneously with the ATC voice communication 106. The aircraft 104 uses the text message and the digital certificate to authenticate the ATC voice communication 106 as described in more detail with reference to FIG. 2.

In some examples, receiving the authentication data 120 includes receiving the authentication data over a different communications channel from a communications channel over which the ATC voice communication is received. In some examples, receiving the authentication data 120 includes receiving the authentication data at a different frequency from a frequency at which the ATC voice communication is received.

In block 124, the ATC voice communication 106 is authenticated using the authentication data 120. In some examples, authentication data for a plurality of ATC facilities is stored onboard the aircraft. The authentication data 120 received by the aircraft 104 from the ATC facility 102 is compared to the authentication data stored onboard the aircraft 104 to authenticate the ATC voice communication 106. An authentication indication is provided in response to the ATC voice communication 106 being authenticated by matching or comparing the authentication data 120 received from the ATC facility 102 to authentication data stored onboard the aircraft 104 corresponding to the ATC facility 102 that transmitted the ATC voice communication 106.

As previously described, receiving the authentication data 120 includes receiving a digital certificate for the ATC facility 102. Authentication data or digital certificates 128 for a plurality of ATC facilities 102 are stored onboard the aircraft 104 for comparison to authentication data or a digital certificate received by the aircraft 104. In block 126, authenticating the ATC voice communication 106 includes authenticating the digital certificate received by the aircraft 104 as the digital certificate for the ATC facility 102 that is supposed to be transmitting the ATC voice communication 106 to the aircraft 104. In some examples, authenticating the ATC voice communication 106 includes comparing the digital certificate received by the aircraft 104 to a digital certificate 128 stored by the aircraft 104 for the ATC facility 102 that is supposed to be transmitting the ATC voice communication 106 to the aircraft 104.

In block 130, a determination is made whether the digital certificate received by the aircraft 104 is authentic and therefore the ATC voice communication 106 is also authentic and is not being spoofed from a source other than the ATC facility 102. If the digital certificate is authentic in block 130, an authentication true or successful indication 132 is provided in response to at least the digital certificate being determined to be authentic. If the digital certificate is not authentic in block 130, an authentication false or failure indication 134 is provided in response to at least the digital certificate being determined to not be authentic. In some examples, the authentication indication 132 or 134 is presented on a cockpit display of the aircraft 104 or by any mechanism to alert the pilot.

Figure 2:
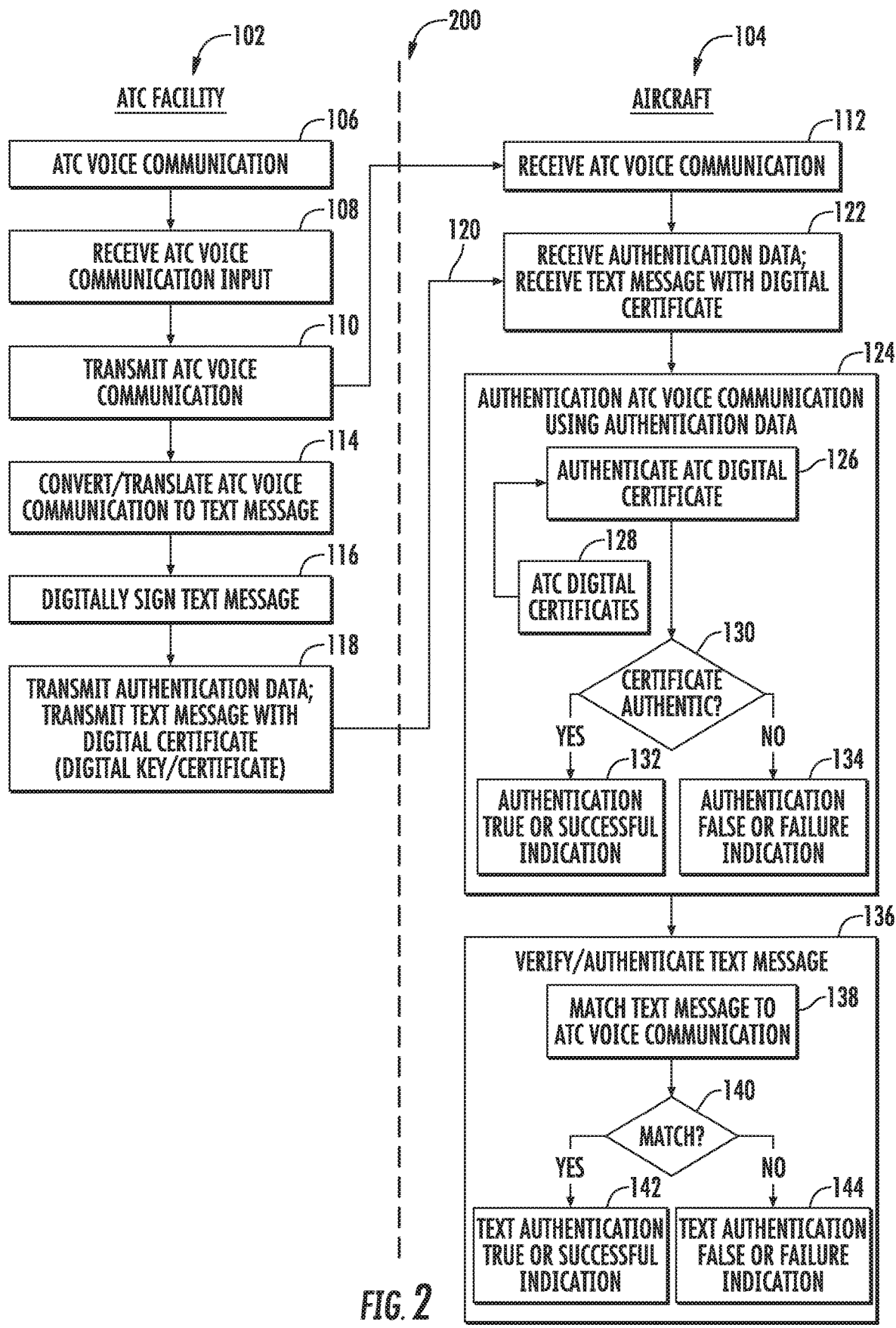
FIG. 2 is a flow chart of an example of a method for ATC radio communications authentication in accordance with another example of the subject disclosure.

FIG. 2 is a flow chart of an example of a method 200 for ATC radio communications authentication in accordance with another example of the subject disclosure. The method 200 is similar to the method 100 except in the method 200 authenticating the ATC voice communication 106 using the authentication data 120 also includes verifying or authenticating the text message. Similar to that previously described with respect to FIG. 1, transmitting the authentication data 120 in block 118 includes transmitting the text message with the associated digital certificate. In block 122, receiving the authentication data 120 includes receiving the text message and the associated digital certificate by the aircraft 104. The text message includes a translation of the ATC voice communication 106 in block 114.

In block 124, the ATC voice communication 106 is authenticated similar to that described in block 124 of FIG. 1. In addition to authenticating the ATC voice communication 106 by authenticating the ATC digital certificate in block 124, in block 136, the ATC voice communication 106 is authenticated by verifying or authenticating the text message.

In block 138, authenticating the ATC voice communication 106 includes matching or comparing the text message received to the ATC voice communication 106 received from the ATC facility 102. In block 140, a determination is made whether there is a match or correspondence between text message and the ATC voice communication 106. If there is a match between the text message and the ATC voice communication 106, a text message authentication true or successful indication 142 is provided. If there is not a match between the text message and the ATC voice communication 106, a text message authentication false or failure indication 144 is provided. In some examples, the text message authentication indication 142 or 144 is presented on a cockpit or flight deck display of the aircraft or by any mechanism to alert the pilot. For examples of an autonomous aircraft, the text message authentication indication 142 or 144 is presented on a display of a flight command center or any arrangement to provide the indication to an operator or pilot.

Figure 3:
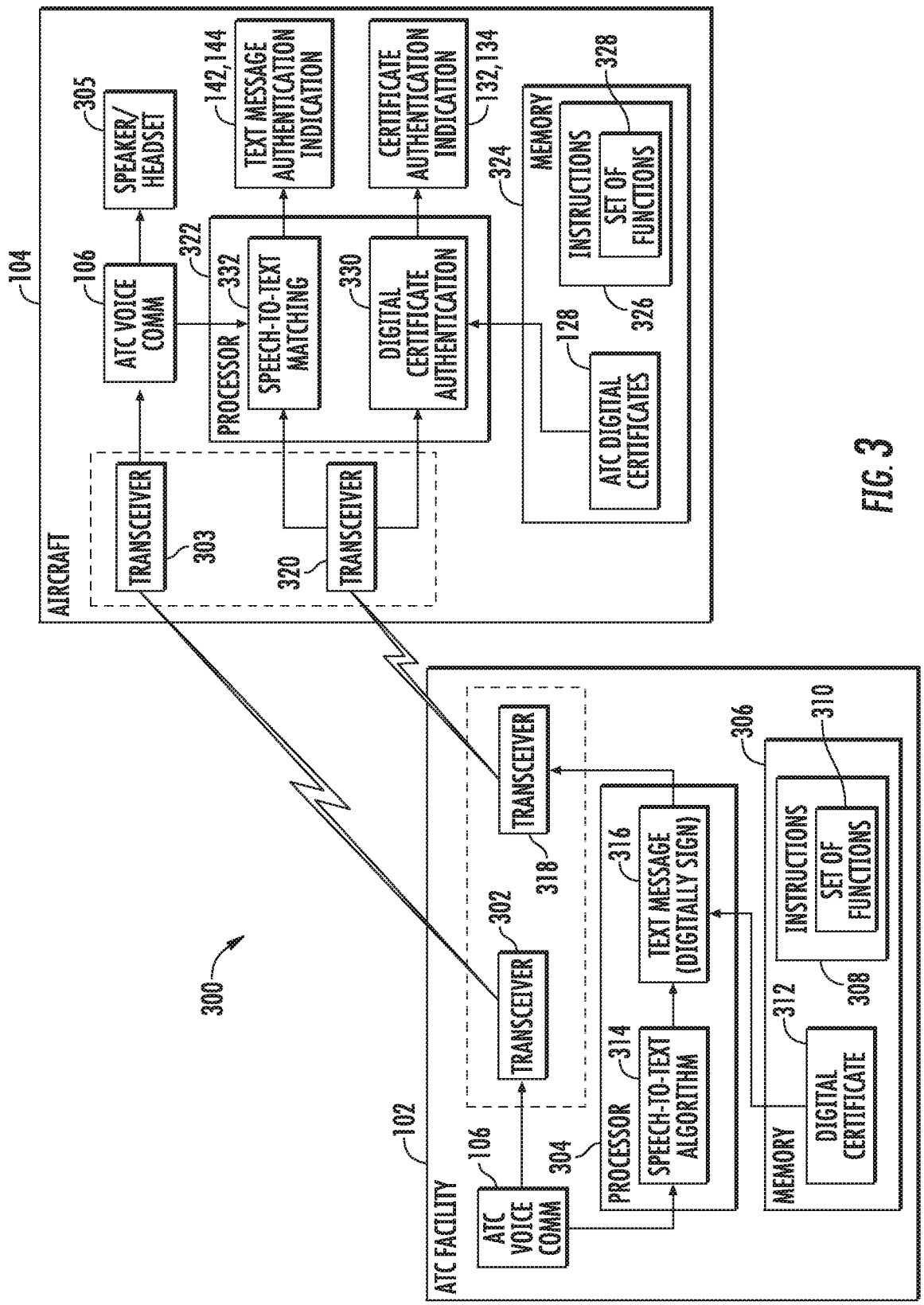
FIG. 3 is a block schematic diagram of an example of a system for ATC radio communications authentication in accordance with an example of the subject disclosure.

FIG. 3 is a block schematic diagram of an example of a system 300 for ATC radio communications authentication in accordance with an example of the subject disclosure. In some examples, the method 100 and/or the method 200 are embodied in and performed by the system 300. The system 300 includes elements that are components of the ATC facility 102 and components of the aircraft 104.

The ATC facility 102 includes a processor 304 and a memory 306 associated with the processor 304. The memory 306 includes computer-readable program instructions 308 that, when executed by the processor 304 causes the processor 304 to perform a set of functions 310 for ATC radio communications authentication as described herein. In some examples, the set of functions 310 correspond to the operations performed by the ATC facility 102 in the method 100 in FIG. 1 and/or the method 200 in FIG. 2. The memory 306 also stores a digital certificate 312 for the ATC facility 102.

The ATC facility 102 also includes a transceiver 302 configured to receive an ATC voice communication 106 and to transmit the ATC voice communication 106 to the aircraft 104 as previously described. The aircraft 104 includes a transceiver 303 configured to receive the ATC voice communication 106. A speaker or headset 305 outputs the ATC voice communication 106 to a pilot or flight crew member of the aircraft 104.

The processor 304 includes a speech-to-text module 314 configured to translate or convert the ATC voice communication 106 to a text message 316. The text message 316 is digitally signed using the digital certificate 312. The text message 316 with the digital certificate 312 is transmitted by a transceiver 318 to the aircraft 104. In some examples, the transceiver 302 and the transceiver 318 are a single transceiver or the same transceiver.

The aircraft 104 includes a transceiver 320 configured to receive the text message 316 and digital certificate 312. In some examples, the transceiver 303 and the transceiver 320 of the aircraft 104 are a single transceiver or the same transceiver.

The aircraft 104 includes a processor 322 and a memory 324 associated with the processor 322. The memory 324 includes computer-readable program instructions 326 that, when executed by the processor 322 causes the processor 322 to perform a set of functions 328 for ATC communications authentication as described herein. In some examples, the set of functions 328 correspond to the operations performed by the aircraft 104 in the method 100 in FIG. 1 and/or the method 200 in FIG. 2. The memory 324 also stores a plurality of ATC digital certificates 128. Each ATC digital certificate 128 is associated with a different ATC facility 102 from which the aircraft 104 may receive ATC voice communications 106. Similar to that described herein, the ATC digital certificates 128 are used to authenticate ATC voice communications 106 from the respective, different ATC facilities 102.

The processor 322 includes a digital certificate authentication module 330 configured to authenticate the ATC voice communications 106 received by the aircraft 104 using the digital certificate 312 received from the ATC facility 102 as previously described in the method 100 of FIG. 1 and/or the method 200 in FIG. 2. An authentication indication 132 or 134 is provided in response to the ATC voice communications 106 being authenticated or not being authenticated. As previously described, an authentication true or successful indication 132 (FIGS. 2 and 3) is provided in response to the digital certificate 312 of the ATC facility 102 being authenticated as being the source of the ATC voice communication 106. An authentication false or failure indication 134 (FIGS. 2 and 3) is provided in response to the digital certificate 312 of the ATC facility 102 not being authenticated as being the source of the ATC voice communication 106. For example, the ATC voice communication may be spoofed or hacked and transmitted by a source other than the ATC facility 102 from which the ATC voice communication is expected to be sent.

In some examples, the processor 322 also includes a speech-to-text matching module 332 or comparison module configured to compare the ATC voice communication 106 received by the aircraft 104 to the text message 316 received by the aircraft 104. A text message authentication indication 142 or 144 is provided based on the speech-to-text matching as previously described in the method 200 in FIG. 2.

The methods and systems disclosed herein (e.g., method 100, method 200, system 300) solve a technical problem of authenticating a transmission source of radio communications on open radio communications frequencies. Conventional systems utilize message encryption to secure communications; however, message encryption is not open for all users to monitor and cannot be utilized in air traffic control communications wherein open communications is a requirement. In contrast to conventional systems, the methods and systems disclosed herein leverage public key infrastructure to digitally sign radio transmissions to allow a radio communications receiver (e.g., aircraft/pilot) to authenticate the source and/or integrity of voice radio messages without encrypting or obfuscating the message.

Further, the disclosure comprises examples according to the following clauses:

Clause 1. A method for air traffic control (ATC) radio communications authentication, comprising:
  receiving, by an aircraft, an ATC voice communication from an ATC facility;
  receiving, by the aircraft, authentication data from the ATC facility substantially contemporaneously with the ATC voice communication, the authentication data being associated with the ATC voice communication; and
  authenticating the ATC voice communication using the authentication data.

Clause 2. The method of clause 1, further comprising, providing an authentication indication in response to the ATC voice communication being authenticated.

Clause 3. The method of any of clauses 1 or 2, wherein receiving the authentication data comprises receiving a digital certificate.

Clause 4. The method of any of clauses 1-2, or 3, wherein authenticating the ATC voice communication comprises authenticating the digital certificate as the digital certificate for the ATC facility that is supposed to be transmitting the ATC voice communication.

Clause 5. The method of any of clauses 1-3, or 4, wherein authenticating the ATC voice communication comprises comparing the digital certificate received by the aircraft to a digital certificate stored by the aircraft for the ATC facility that is supposed to be transmitting the ATC voice communication.

Clause 6. The method of any of clauses 1-4, or 5, further comprising:
  providing an authentication true or successful indication in response to at least the digital certificate being determined to be authentic; and providing an authentication false or failure indication in response to at least the digital certificate being determined to not be authentic.

Clause 7. The method of any of clauses 1-5, or 6, further comprising storing, onboard the aircraft, authentication data for a plurality of ATC facilities.

Clause 8. The method of any of clauses 1-6, or 7, wherein storing, onboard the aircraft, the authentication data comprises storing, onboard the aircraft, a digital certificate for each of the plurality of ATC facilities.

Clause 9. The method of any of clauses 1-7, or 8, wherein receiving the authentication data comprises receiving a text message, wherein the text message comprises a translation of the ATC voice communication.

Clause 10. The method of any of clauses 1-8, or 9, wherein authenticating the ATC voice communication comprises comparing or matching the text message received to the ATC voice communication received from the ATC facility.

Clause 11. The method of any of clauses 1-9, or 10, wherein receiving the authentication data includes receiving the authentication data over a different communications channel to a communications channel over which the ATC voice communication is received.

Clause 12. The method of clauses 1-10, or 11, wherein receiving the authentication data includes receiving the authentication data at a different frequency from a frequency at which the ATC voice communication is received.

Clause 13. A method for air traffic control (ATC) radio communication authentication, comprising:
transmitting, by an ATC facility, an ATC voice communication to an aircraft; and
transmitting, by the ATC facility, authentication data to the aircraft, the authentication data being associated with the ATC voice communication, wherein the ATC voice communication is authenticated by the aircraft using the authentication data.

Clause 14. The method of clause 13, wherein transmitting the authentication data to the aircraft comprises transmitting a digital certificate of the ATC facility to the aircraft to authenticate the ATC voice communication by the aircraft.

Clause 15. The method of any of clauses 13 or 14, further comprising:
translating the ATC voice communication to a text message;
digitally signing the text message, wherein the authentication data comprises the text message with a digital certificate; and
transmitting the text message with a digital certificate to the aircraft substantially contemporaneously with the ATC voice communication, wherein the aircraft uses the text message and the digital certificate to authenticate the ATC voice communication.

Clause 16. The method of any of clauses 13-14, or 15, wherein transmitting the authentication data includes transmitting the authentication data over a different communications channel to a communications channel over which the ATC voice communication is transmitted.

Clause 17. The method of any of clauses 13-15, or 16, wherein transmitting the authentication data includes transmitting the authentication data at a different frequency from a frequency at which the ATC voice communication is transmitted.

Clause 18. A system for air traffic control (ATC) radio communications authentication, comprising:
a processor; and
a memory associated with the processor, the memory comprising computer-readable program instructions that, when executed by the processor causes the processor to perform a set of functions comprising:
receiving an ATC voice communication from an ATC facility;
receiving authentication data from the ATC facility substantially contemporaneously with the ATC voice communication, the authentication data being associated with the ATC voice communication; and
authenticating the ATC voice communication using the authentication data.

Clause 19. The system of clause 18, wherein the set of functions further comprises providing an authentication indication in response to the ATC voice communication being authenticated.

Clause 20. The system of any of clauses 18 or 19, wherein receiving the authentication data comprises receiving a digital certificate.

Clause 21. The system of any of clauses 18-19, or 20, wherein authenticating the ATC voice communication comprises authenticating the digital certificate as the digital certificate for the ATC facility that transmitted the ATC voice communication.

Clause 22. The system of any of clauses 18-20, or 21, wherein authenticating the ATC voice communication comprises comparing the digital certificate received by the aircraft to a digital certificate stored by the aircraft for the ATC facility that is supposed to be transmitting the ATC voice communication.

Clause 23. The system of any of clauses 18-21, or 22, further comprising: providing an authentication true or successful indication in response to at least the digital certificate being determined to be authentic; and providing an authentication false or failure indication in response to at least the digital certificate being determined to not be authentic.

Clause 24. The system of any of clauses 18-22, or 23, further comprising storing, onboard the aircraft, authentication data for a plurality of ATC facilities.

Clause 25. The system of any of clauses 18-23, or 24, wherein storing the authentication data comprises storing, onboard the aircraft, a digital certificate for each of the plurality of ATC facilities.

Clause 26. The system of any of clauses 18-24, or 25, wherein receiving the authentication data comprises receiving a text message, wherein the text message comprises a translation of the ATC voice communication.

Clause 27. The system of any of clauses 18-25, or 26, wherein authenticating the ATC voice communication comprises comparing the text message received to the ATC voice communication received from the ATC facility.

Clause 28. The system of any of clauses 18-26, or 27, wherein receiving the authentication data includes receiving the authentication data over a different communications channel to a communications channel over which the ATC voice communication is received.

Clause 29. The system of any of clauses 18-27, or 28, wherein receiving the authentication data includes receiving the authentication data at a different frequency from a frequency at which the ATC voice communication is received.

Clause 30. A system for air traffic control (ATC) radio communications authentication, comprising:
a processor; and
a memory associated with the processor, the memory comprising computer-readable program instructions that, when executed by the processor causes the processor to perform a set of functions comprising:
  directing or transmitting an ATC voice communication to an aircraft; and
  directing or transmitting authentication data to the aircraft, the authentication data being associated with the ATC voice communication, wherein the aircraft uses the authentication data to authenticate the ATC voice communication.

Clause 31. The system of clause 30, wherein transmitting the authentication data to the aircraft comprises transmitting a digital certificate of an ATC facility to the aircraft to authenticate the ATC voice communication by the aircraft.

Clause 32. The system of any of clauses 30 or 31, wherein the set of functions further comprise:
  translating the ATC voice communication to a text message; and digitally signing the text message, wherein the authentication data comprises the text message with a digital certificate; and
  transmitting the text message with a digital certificate to the aircraft substantially contemporaneously with the ATC voice communication, wherein the aircraft uses the text message and the digital certificate to authenticate the ATC voice communication.

Clause 33. The system of any of clauses 30-31, or 32, wherein transmitting the authentication data includes transmitting the authentication data over a different communications channel to a communications channel over which the ATC voice communication is transmitted.

Clause 34. The system of any of clauses 30-32, or 33, wherein transmitting the authentication data includes transmitting the authentication data at a different frequency from a frequency at which the ATC voice communication is transmitted.

The flowchart and block diagrams in the Figures illustrate the architecture, functionality, and operation of possible implementations of systems, methods, and computer program products according to various examples of the subject disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular examples only and is not intended to be limiting of examples of the disclosure. As used herein, the singular forms "a", "an" and "the" are intended to include the plural forms as well, unless the context clearly indicates otherwise. It will be further understood that the terms "include," "includes," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present examples has been presented for purposes of illustration and description, but is not intended to be exhaustive or limited to examples in the form disclosed. Many modifications and variations will be apparent to those of ordinary skill in the art without departing from the scope and spirit of examples.

Although specific examples have been illustrated and described herein, those of ordinary skill in the art appreciate that any arrangement which is calculated to achieve the same purpose may be substituted for the specific examples shown and that the examples have other applications in other environments. This application is intended to cover any adaptations or variations. The following claims are in no way intended to limit the scope of examples of the disclosure to the specific examples described herein.

What is claimed is:

1. A method, comprising:
  receiving, by an aircraft, an ATC voice communication from an air traffic control (ATC) facility;
  receiving, by the aircraft, authentication data from the ATC facility substantially contemporaneously with the ATC voice communication, the authentication data being associated with the ATC voice communication, wherein the ATC voice communication and the authentication data are received in separate transmissions; and
  authenticating the ATC voice communication using the authentication data to confirm to a pilot whether the ATC voice communication is actually from the ATC facility or a source spoofing or impersonating the ATC facility, wherein the aircraft is controlled by the pilot in response to authenticating the ATC voice communication is actually from the ATC facility.

2. The method of claim 1, further comprising, providing an authentication indication to the pilot in response to the ATC voice communication being authenticated.

3. The method of claim 1, wherein the receiving the authentication data comprises receiving a digital certificate.

4. The method of claim 3, wherein the authenticating the ATC voice communication comprises authenticating the digital certificate as the digital certificate for the ATC facility that is supposed to be transmitting the ATC voice communication.

5. The method of claim 3, wherein the authenticating the ATC voice communication comprises comparing the digital certificate received by the aircraft to a digital certificate stored by the aircraft for the ATC facility that is supposed to be transmitting the ATC voice communication.

6. The method of claim 3, further comprising:
  providing an authentication true or successful indication to the pilot in response to at least the digital certificate being determined to be authentic; and
  providing an authentication false or failure indication to the pilot in response to at least the digital certificate being determined to not be authentic.

7. The method of claim 1, further comprising, storing, onboard the aircraft, authentication data for a plurality of ATC facilities.

8. The method of claim 1, wherein the receiving the authentication data comprises receiving the authentication data at a different frequency from a frequency at which the ATC voice communication is received.

9. The method of claim 1, wherein the receiving the authentication data comprises receiving a text message, wherein the text message comprises a translation of the ATC voice communication.

10. The method of claim 9, wherein the authenticating the ATC voice communication comprises comparing the text message received to the ATC voice communication received from the ATC facility.

11. A method, comprising:
transmitting, by an air traffic control (ATC) facility, an ATC voice communication to an aircraft; and
transmitting, by the ATC facility, authentication data to the aircraft, the authentication data being associated with the ATC voice communication, wherein the ATC voice communication is authenticated by the aircraft using the authentication data to confirm to a pilot whether the ATC voice communication is actually from the ATC facility or a source spoofing or impersonating the ATC facility, and wherein the ATC voice communication and the authentication data are transmitted in separate transmissions, wherein the aircraft is controlled by the pilot in response to authenticating the ATC voice communication is actually from the ATC facility.

12. The method of claim 11, wherein the transmitting the authentication data to the aircraft comprises transmitting a digital certificate of the ATC facility to the aircraft to authenticate the ATC voice communication by the aircraft.

13. The method of claim 11, further comprising:
translating the ATC voice communication to a text message;
digitally signing the text message, wherein the authentication data comprises the text message with a digital certificate; and
transmitting the text message with the digital certificate to the aircraft substantially contemporaneously with the ATC voice communication, wherein the aircraft uses the text message and the digital certificate to authenticate the ATC voice communication.

14. A system, comprising:
a processor; and
a memory associated with the processor, the memory comprising computer-readable program instructions that, when executed by the processor causes the processor to perform a set of functions comprising:
receiving an air traffic control (ATC) voice communication from an ATC facility;
receiving authentication data from the ATC facility substantially contemporaneously with the ATC voice communication, the authentication data being associated with the ATC voice communication, wherein the ATC voice communication and the authentication data are received in separate transmissions; and
authenticating the ATC voice communication using the authentication data to confirm to a pilot whether the ATC voice communication is actually from the ATC facility or a source spoofing or impersonating the ATC facility, wherein the aircraft is controlled by the pilot in response to authenticating the ATC voice communication is actually from the ATC facility.

15. The system of claim 14, wherein the set of functions further comprises providing an authentication indication to the pilot in response to the ATC voice communication being authenticated.

16. The system of claim 14, wherein the receiving the authentication data comprises receiving a digital certificate.

17. The system of claim 16, wherein the authenticating the ATC voice communication comprises authenticating the digital certificate as the digital certificate for the ATC facility that transmitted the ATC voice communication.

18. A system, comprising:
a processor; and
a memory associated with the processor, the memory comprising computer-readable program instructions that, when executed by the processor causes the processor to perform a set of functions comprising:
directing an air traffic control (ATC) voice communication to an aircraft from an ATC facility; and
directing authentication data to the aircraft, the authentication data being associated with the ATC voice communication, wherein the aircraft uses the authentication data to authenticate the ATC voice communication to confirm to a pilot whether the ATC voice communication is actually from the ATC facility or a source spoofing or impersonating the ATC facility, and wherein the ATC voice communication and the authentication data are transmitted in separate transmissions, wherein the aircraft is controlled by the pilot in response to authenticating the ATC voice communication is actually from the ATC facility.

19. The system of claim 18, wherein the directing the authentication data to the aircraft comprises transmitting a digital certificate of an ATC facility to the aircraft to authenticate the ATC voice communication by the aircraft.

20. The system of claim 18, wherein the set of functions further comprise:
translating the ATC voice communication to a text message; and
digitally signing the text message, wherein the authentication data comprises the text message with a digital certificate; and
transmitting the text message with the digital certificate to the aircraft substantially contemporaneously with the ATC voice communication, wherein the aircraft uses the text message and the digital certificate to authenticate the ATC voice communication.

* * * * *